United States Patent Office 3,507,109
Patented Apr. 21, 1970

3,507,109
FISHING GILL NETS
Mitsutake Nakazawa, Hakodate-shi, Japan, assignor to Hakodate Seimo Sengu Co., Ltd., Hokkaido, Japan, a corporation of Japan
Filed Aug. 14, 1967, Ser. No. 660,520
Claims priority, application Japan, Oct. 31, 1966, 41/71,633
Int. Cl. A01k 73/00; D02g 3/44
U.S. Cl. 57—140                               1 Claim

ABSTRACT OF THE DISCLOSURE

A knotted fishing gill net formed of a plurality of net cords each including a number of fibers twisted in spiral arrangement in one direction.

BACKGROUND OF THE INVENTION

This invention relates to improvements in fishing gill nets widely used for catching relatively big fishes such as salmon and trouts, and more particularly to a knotted gill net of which net cords are improved.

A fishing gill net is employed in gill net fishery wherein when fishes are passing through the meshes of the gill net set in the body of water, the net cords of the net tighten or twine around the bodies of the fishes to bind movements of the fishes. It has been well known that in the gill net, fish catching ability can be greatly improved by rendering the cords forming the gill net as thin and as flexible as possible.

On the other hand, the cords of the gill nets are also required to have a strength enough to endure loads to which they are subjected during a usual fishing operation. This requirement contradicts that required for increasing fish catching ability, i.e., the flexibility and thinness of the cords.

A prior art three-laid or four-laid cord forming conventional gill nets has been selected for compromising the two requirements contradictory to each other. The prior art twisted cord is formed by twisting a number of fibers in a direction to form bundles or strands and finally twisting three or four yarns thus preliminarily twisted, in an opposite direction to that of the preliminary twist. As is well known, however, the cord of such structure will tend to be lowered in strength due to such causes as friction between fibers as the number of twists per unit length is increased, the tendency becoming conspicuous as the fibers are reduced in diameter and increased in flexibility. The minimum diameter of the net cord to provide a necessary strength is larger than the maximum diameter to provide a required flexibility and thinness. Where the number of twists of the cord is decreased on the contrary, although deterioration in strength caused by the intersection of fibers becomes inconspicuous, part of the yarns of the cord will be apt to depart for from the axis of the cord during a fishing operation wherein the net is used under severe conditions. The departure of part of the yarns occurs because a twisted cord of a small number of twists is generally of unstable twisting structure, although the stability depends on the skill of twisting technique. The cord of disordered twisting structure is not capable of maintaining a predetermined strength for a long period of time, since, when such cord is drawn, only some of the yarns are subjected to the load.

SUMMARY OF THE INVENTION

This invention provides a knotted fishing gill net formed of net cords each including a number of fibers twisted in spiral arrangement in one direction.

In a cord for forming a gill net according to this invention, all the fibers thereof are twisted in one direction, so that the fibers do not intersect each other or even if they intersect, only at a small angle, in contrast to the prior art cord wherein a plurality of yarns twisted in one direction are again twisted in the opposite direction. This means that the lowering in strength is greatly decreased which is caused by the intersection of the fibers at a large angle when the cord is subjected to a high tensile load. In addition, all the fibers always exhibit turning forces in a fixed direction opposite to the twisted direction, with the result that no part of fibers is lengthened or shortened relative to other parts, which is also a factor preventing the cord from being reduced in strength. The cord having therein no factor lowering its strength can have a reduced diameter and still be as strong as the prior art cord, so that there is achieved the reduction in diameter and the increase in flexibility. Therefore, the knotted fishing gill net according to the present invention, formed of such cords will attain an excellent fish catching capability.

DESCRIPTION OF THE PREFERRED EMBODIMENT

Figure 1:
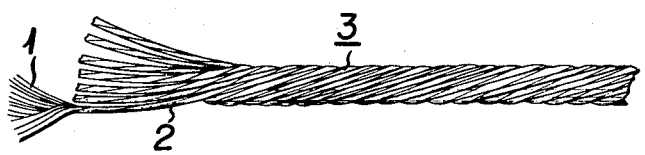
FIG. 1 is a fragmentary view showing a cord used in a fishing gill net according to this invention.
Figure 2:
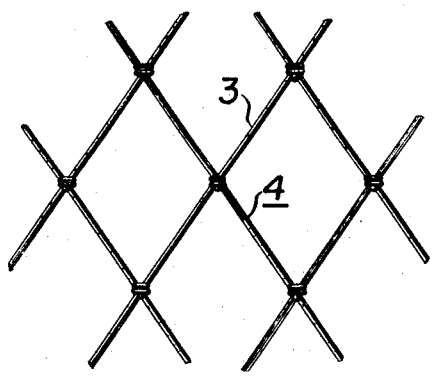
FIG. 2 is a similar view showing a part of the fishing gill net.

In FIG. 1, the reference numeral 1 designates a synthetic fiber or filament, such as a nylon filament of 210 denier in fineness. A plurality of, for example fifteen fibers 1 are bundled with a slight twist in one direction to form a bundle or strand 2. Seven strands 2 are twisted in spiral arrangement in the same direction as the fibers 1 at the pitch of, for instance, four twists per inch, to form a cord 3. In order to form a fishing gill net 4 shown in FIG. 2, a necessary number of cords 3 are knotted in a double sheet or double trawler knots.

Since the filaments 1 of the cord 3 are all twisted in one direction, the cord 3 has few factors which are repelling to any of the twists, and hence exhibits a higher flexibility than that of the prior art cord formed of the same number of filaments as in the cord 3. A more important fact is that the cord 3 is scarcely limited in the number of twists per unit length. More particularly, in the prior art cord, the preliminary twist of the yarns must be balanced with the final twist in another direction opposite thereto to provide a stable twisting structure, and when the twisting balance is not properly maintained, a tensile force or a bend applied to the cord will easily deform an initial twisting shape with the result that the appearances and strength of the cord will be deteriorated. In contrast, in the cord used in this invention, the twists are in only one direction, so that the cord is not limited in the number of twists to adjust the twisting balance, with the result that the cord is only required to be such that the filaments can maintain the bundled state thereof. The cord of such small number of twists will naturally render itself very flexible.

The twist of the filaments in a fixed direction provides further advantages to the cord. One of the most important advantages is that since the sectional shape of the cord is substantially circular, the cord in this invention is considerably reduced in diameter when compared with the prior art cord formed of filaments of the same number as, and of the same diameter as those of the cord in this invention. The cord really being smaller in diameter will be seen still thinner in the water because of a less amount of reflected light owing to the smoothness of the outer surface of the crowd. Another advantage is that the cord is free from the defect that the filaments forming the cord are lowered in strength by a strong twist, and improvements in strength resulting from this arrangement are noticed in the loop strength. Data regarding the strength of the cord employed in the gill net according to this invention is shown in the following table, with those of the prior art three-laid cord formed of the same filaments as those of the cord in this invention.

| The No. of filaments | | The prior art three-laid cord | | The cord in this invention | |
|---|---|---|---|---|---|
| | | Dry | Wet | Dry | Wet |
| 6 | Fineness (denier) | 1,341 | | 1,287 | |
| | Straight | 9.0 | 7.5 | 8.4 | 7.6 |
| | Strength (kg.) loop | 5.7 | 4.7 | 6.1 | 5.7 |
| 7 | Fineness (denier) | 1,565 | | 1,512 | |
| | Straight | 10.7 | 8.8 | 9.8 | 8.5 |
| | Strength (kg.) loop | 6.6 | 5.5 | 7.1 | 6.6 |
| 8 | Fineness (denier) | 1,798 | | 1,728 | |
| | Straight | 11.9 | 10.2 | 11.2 | 10.1 |
| | Strength (kg.) loop | 6.7 | 6.5 | 8.1 | 7.6 |
| 9 | Fineness (denier) | 2,012 | | 1,935 | |
| | Straight | 13.4 | 11.5 | 12.6 | 11.4 |
| | Strength (kg.) loop | 7.6 | 7.6 | 9.1 | 8.5 |
| 10 | Fineness (denier) | 2,304 | | 2,142 | |
| | Straight | 14.8 | 14.0 | 14.0 | 12.7 |
| | Strength (kg.) loop | 8.5 | 8.2 | 10.1 | 9.5 |

As apparent from the above data, the cord used in the gill net according to this invention is far superior particularly in the loop strength to the prior art three-laid cord.

The filaments for forming the cord in the novel fishing gill net can be optionally selected in material, fineness and number, and advantageously they are thin filaments made of a resilient material to increase the flexibility of the formed cord. In connection also with the flexibility, desirably the number of twists per unit length imparted to the cord is small so far as each filament can be bundled. The best results are usually obtained when the number of twists per inch is selected below 20, preferably in the range of 2 to 10. The cords thus prepared are formed into a net by the usual knot-forming methods, and the structure of the knot employed should be either a mesh or sheet bent knot, or a double sheet or double trawler knot. It should be understood, however, that this invention is not restricted to the above-mentioned number of twists and structure of the knot.

What is claimed is:

1. A knotted fishing gill net formed of a plurality of cords, each cord including a plurality of strands twisted in spiral arrangement in one direction with a pinch of 2–10 twists per inch, each strand being respectively composed of a plurality of filaments twisted together in a spiral in the same direction as the twist of said strands, whereby said cord can be made to minimum diameter with great flexibility.

References Cited

UNITED STATES PATENTS

| | | | |
|---|---|---|---|
| 2,281,036 | 4/1942 | Hetzel | 57—144 |
| 2,309,564 | 1/1943 | Anderson et al. | 57—139 |
| 1,897,224 | 2/1933 | Andrews | 57—139 |
| 2,590,586 | 3/1952 | Thompson et al. | 87—1 |
| 3,329,061 | 7/1967 | Momoi | 87—12 |
| 3,369,317 | 2/1968 | Brownell | 43—7 |

JOHN PETRAKES, Primary Examiner

U.S. Cl. X.R.

43—10; 87—12